US010262473B2

(12) United States Patent
Lu et al.

(10) Patent No.: US 10,262,473 B2
(45) Date of Patent: Apr. 16, 2019

(54) SYSTEMS AND METHODS FOR SUSPENSION VIBRATION ON-BOARD DETECTION

(71) Applicant: FORD GLOBAL TECHNOLOGIES, LLC, Dearborn, MI (US)

(72) Inventors: Xianqiang Lu, Novi, MI (US); Dan Brian Coleman, Dearborn, MI (US); Raghavendra Baragur, Farmington Hills, MI (US); Arun Veeraraghavan, Ann Arbor, MI (US); Gopi Nimmagadda, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 507 days.

(21) Appl. No.: 14/813,645

(22) Filed: Jul. 30, 2015

(65) Prior Publication Data

US 2017/0032592 A1 Feb. 2, 2017

(51) Int. Cl.
*G07C 5/08* (2006.01)
*B60G 17/019* (2006.01)
*B60G 17/0185* (2006.01)

(52) U.S. Cl.
CPC ....... *G07C 5/0808* (2013.01); *B60G 17/0185* (2013.01); *B60G 17/01908* (2013.01); *B60G 2400/10* (2013.01); *B60G 2600/044* (2013.01); *B60G 2600/08* (2013.01); *B60G 2600/09* (2013.01)

(58) Field of Classification Search
CPC .............................................. B60G 2600/182
USPC ................. 701/37, 38; 280/5.501, 5.5, 5.15; 706/14, 47, 900
See application file for complete search history.

(56) References Cited

U.S. PATENT DOCUMENTS

| 3,833,094 A | 9/1974 | Grossman |
| 4,696,489 A | 9/1987 | Fujishiro et al. |
| 5,058,918 A | 10/1991 | Nakaya et al. |
| 5,601,307 A * | 2/1997 | Heyring ............... B60G 17/015 280/6.157 |

(Continued)

FOREIGN PATENT DOCUMENTS

| DE | 10 2012 224111 A1 | 6/2014 |
| EP | 2511686 A1 | 10/2012 |
| JP | 4500661 B2 | 4/2010 |

OTHER PUBLICATIONS

Control over negative effects of vertical vibration on independent steering/driving wheels of an electric vehicle; Zhijun Deng; Zhurong Dong; Hao Qiu; International Conference on Automatic Control and Artificial Intelligence (ACAI 2012) Year: 2012; pp. 717-721, DOI: 10.1049/cp.2012.1078.*

(Continued)

*Primary Examiner* — Cuong H Nguyen
(74) *Attorney, Agent, or Firm* — Jones Robb, PLLC; Raymond Coppiellie

(57) ABSTRACT

Systems and methods for determining a status of a vehicle suspension system are disclosed. A vertical acceleration of the vehicle relative to a road surface is determined based on a position of a vehicle body. Based on a predetermined period of time, a peak value that corresponds to the vertical acceleration is calculated. The peak value is compared to a target peak value and, when the peak value meets a preset criteria, a notification of potential suspension degradation is issued.

20 Claims, 3 Drawing Sheets

(56) References Cited

U.S. PATENT DOCUMENTS

| | | | |
|---|---|---|---|
| 5,847,658 A | 12/1998 | Irie et al. | |
| 5,944,763 A * | 8/1999 | Iwasaki | B60G 17/0162 280/5.5 |
| 7,035,836 B2 * | 4/2006 | Caponetto | B60G 17/018 706/14 |
| 7,813,850 B2 | 10/2010 | Mannerfelt | |
| 2002/0185827 A1 * | 12/2002 | Caponetto | B60G 17/018 280/5.5 |
| 2005/0110226 A1 | 5/2005 | Sasada | |
| 2005/0113997 A1 * | 5/2005 | Kim | B60G 17/0165 701/37 |
| 2007/0192013 A1 * | 8/2007 | Bando | B60T 7/22 701/93 |
| 2008/0243334 A1 * | 10/2008 | Bujak | B60G 17/0165 701/37 |
| 2009/0071772 A1 * | 3/2009 | Cho | B60G 17/016 188/266.4 |
| 2009/0112402 A1 * | 4/2009 | Furuichi | B60G 17/016 701/38 |
| 2012/0296514 A1 * | 11/2012 | Sohmshetty | G06F 17/30539 701/30.2 |
| 2013/0105241 A1 * | 5/2013 | Christian | B60K 17/12 180/337 |
| 2013/0201316 A1 * | 8/2013 | Binder | H04L 67/12 348/77 |
| 2015/0081171 A1 * | 3/2015 | Ericksen | B60G 17/016 701/37 |
| 2015/0224845 A1 * | 8/2015 | Anderson | B60G 17/019 701/37 |

OTHER PUBLICATIONS

Development of a Fuzzy Sky-hook Algorithm for a Semi-active ER Vehicle Suspension Using Inverse Model; Jeongmok Cho; Taegeun Jung; Sung-Ha Kwon; Joongseon Joh; 2006 IEEE International Conference on Fuzzy Systems; Year: 2006 pp. 1550-1556, DOI: 10.1109/FUZZY.2006.1681914.*

Semi active suspension system performance under random road profile excitations; S. A. Abu Bakar; P. M. Samin; H. Jamaluddin; R. A. Rahman; S. Sulaiman; 2015 International Conference on Computer, Communications, and Control Technology (I4CT) Year: 2015; pp. 93-97, DOI: 10.1109/I4CT.2015.7219544.*

GA tuned Type-2 Fuzzy Logic Controller for vehicle suspension system; P. Subha Celin ; K. Rajeswari; 2012 International Conference on Computing, Electronics and Electrical Technologies (ICCEET); pp. 383-388; IEEE Conferences; year 2012.*

Adaptive backstepping controller for a vehicle active suspension system; R. Kalaivani ; P. Lakshmi; IET Chennai Fourth International Conference on Sustainable Energy and Intelligent Systems (SEISCON 2013); pp. 152-158; IET Conferences, year 2013.*

Coordinate optimization of semi-active energy regenerative suspension with EHA; Farong Kou ; Jiafeng Du ; Zhe Wang; 2017 IEEE 3rd Information Technology and Mechatronics Engineering Conference (ITOEC); pp. 380-385; IEEE Conferences, yera 2017.*

Velopment of a Fuzzy Sky-hook Algorithm for a Semi-active ER Vehicle Suspension Using Inverse Model; Jeongmok Cho ; Taegeun Jung ; Sung-Ha Kwon ; Joongseon Joh; 006 IEEE International Conference on Fuzzy Systems; Year: 2006 pp. 1550-1556; EEE Conferences.*

* cited by examiner

SYSTEMS AND METHODS FOR SUSPENSION VIBRATION ON-BOARD DETECTION

TECHNICAL FIELD

The present application relates generally to a large-scale vibration detection system, and more specifically, to an on-board diagnostic system used to alert a vehicle operator of identified suspension degradation and/or an encountered rough road condition.

BACKGROUND

A vehicle's suspension system plays a vital role in serving to isolate the occupants of a vehicle from irregularities of the road surface and to provide a safe and comfortable mode of transportation. Because vehicles are designed to drive on a variety of road surfaces, occasionally a vehicle may encounter an exceptional (abnormal) road condition, such as debris, potholes, bumps and the like, which results in isolated large-scale suspension vibrations that may be felt by vehicle occupants. Adaptive or active suspension systems enable selective adjustment of the suspension characteristics such as damping and stiffness, responsive to the contact between the vehicle wheels and the abnormal road feature. In isolated incidents, this helps to improve the vehicle's ride comfort and handling.

Over time, however, the vehicle's suspension system may become degraded such that large-scale suspension vibrations are continuously induced and, in some instances, not felt by vehicle occupants. For example, a wheel suspension of the vehicle's suspension system can include at least a spring element that reduces stresses on the vehicle and hydraulic shock absorbers. The hydraulic shock absorbers are configured such that oscillations of at least the portion of the vehicle that is spring suspended is damped. Degradation (e.g., an impaired ability to damp the oscillations) of the hydraulic shock absorbers adversely affects the vehicle's ride comfort and handling. In other instances, recurring large-scale suspension vibrations may also be induced when, for example, the vehicle is driven for an extended period of time on a rough road surface. These recurring large-scale suspension vibrations also may affect vehicle control.

Due to the improved design of hydraulic shock absorbers, mounts, bushings, and isolation materials inside the vehicle that help to "block" the large-scale suspension vibrations from being transferred to vehicle occupants, early warning signs of suspension degradation and/or a rough road condition are difficult to detect. Further, while isolated large-scale vibrations that result from an encountered abnormal road condition may be felt by vehicle occupants, after passing the isolated event there is often no clear indication of related residual effects unless the vehicle is damaged. Thus, it is desirable to implement a vehicle on-board system that can detect continuous and/or recurring large-scale suspension vibrations and alert the vehicle driver to check the vehicle's suspension system for degradation and/or an undesired operational condition caused by the recurring large-scale suspension vibrations.

SUMMARY

In accordance with various exemplary embodiments, systems and methods for determining a status of a vehicle suspension system are described. In accordance with one aspect of the present disclosure, a method for determining a status of a vehicle suspension system includes determining a vertical acceleration of the vehicle relative to a road surface based on a position of a vehicle body. Based on a predetermined period of time, a peak value that corresponds to the vertical acceleration is calculated. The peak value is compared to a target peak value and, when the peak value meets a preset criteria, a notification of potential suspension degradation is issued to a vehicle driver.

In accordance with another aspect of the present disclosure, a system for determining a status of a vehicle suspension system is provided. The system comprises a processing unit configured to determine a vertical acceleration of a vehicle relative to a road surface. The processing unit is configured to calculate a peak acceleration value based on a predetermined period of time and to compare the peak acceleration value to a target peak value. When the peak acceleration value meets a preset criteria, the processing unit is configured to alert a vehicle driver of potential suspension degradation.

In accordance with a further aspect of the present disclosure, a method for monitoring a vehicle suspension system is provided. The method comprises determining a vertical acceleration of the vehicle based on a position of a vehicle body. An RMS value is calculated based on a predetermined period of time. The calculated RMS value is compared to a target RMS value and, when the calculated RMS value meets a preset criteria, a vehicle driver is alerted of a rough road condition.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
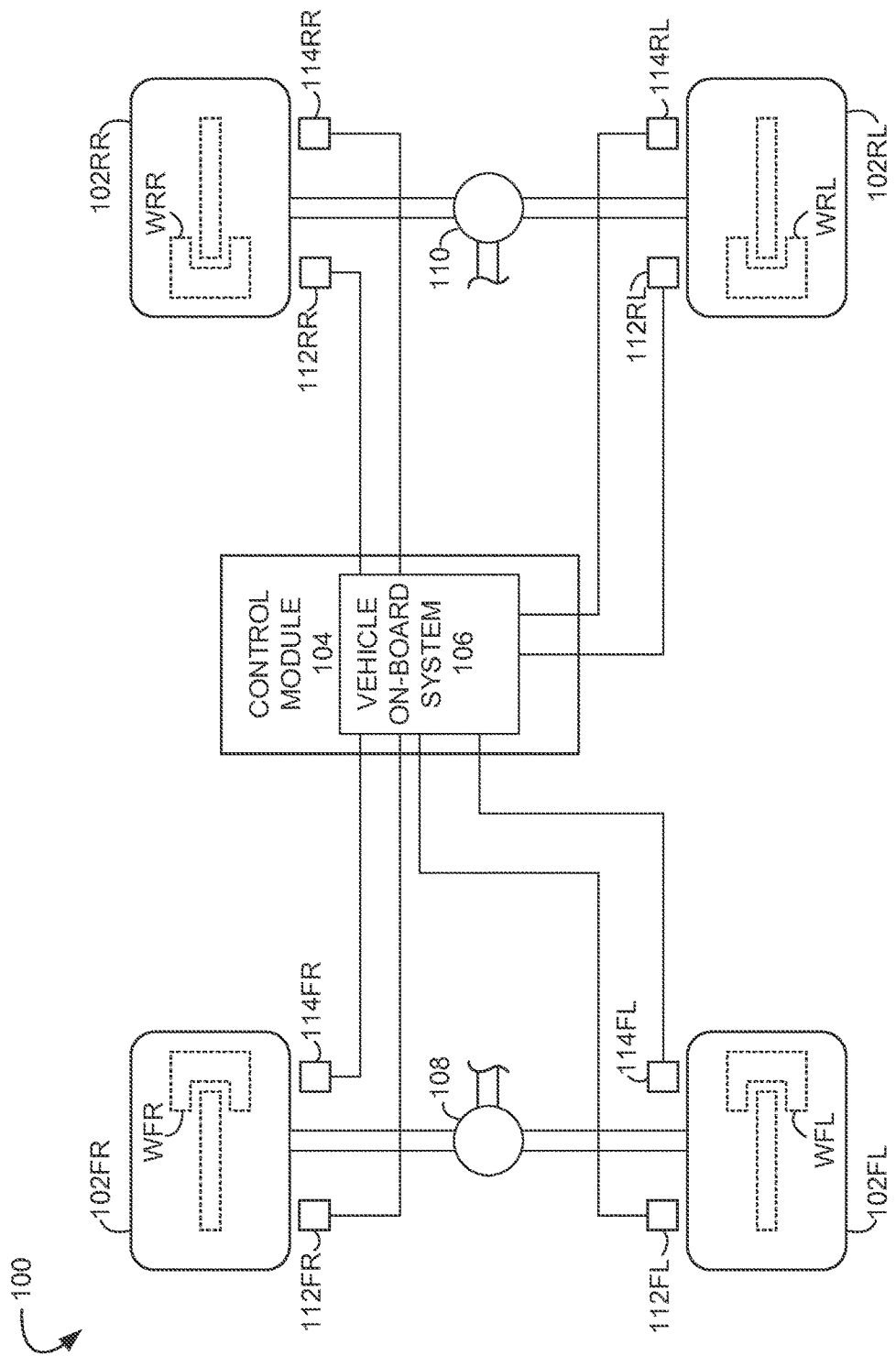
FIG. 1 is a schematic structural diagram of a vehicle having an on-board vibration detection/diagnostic system in accordance with one or more exemplary embodiments of the disclosed subject matter.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a vehicle driver may approach an irregularity in the road surface (e.g., an abnormal road condition) too fast. In some instances, when, for example, the vehicle driver does not anticipate an abnormal road condition, the vehicle contact may result in isolated large-scale suspension vibration. For example, quantification of suspension vibrations of a vehicle may vary from vehicle to vehicle and a vehicle's response to suspension vibration differs based on the road surface roughness and the vehicle's suspension tuning. To distinguish and/or establish limits for small-scale (e.g., an International Roughness Index (IRI) that is less than 2.7 m/km), medium-scale (e.g., an IRI that is between 2.7 m/km and 3.5 m/km), large-scale (e.g., an IRI that is between 3.5 m/km and 4.6 m/km), and/or severe (e.g., an IRI that is greater than 4.6 m/km) suspension vibrations, the vehicle's response may be monitored and recorded on varying road surfaces having, for example, a known IRI. By automatically monitoring for such conditions and dynamically adjusting various suspension characteristics such as damping and stiffness, responsive to the contact between the vehicle wheels and the abnormal road feature, the effect of such abnormal conditions on the vehicle can be mitigated. Thus, the impact of the large-scale suspension vibration on occupants of the vehicle is reduced and modulated such that the vehicle ride is comfortable for occupants. Due to the improved design of hydraulic shock absorbers, mounts, bushings, and various isolation materials inside the vehicle that help to "block" the large-scale suspension vibrations, damage that results from wheel contact with the abnormal road condition(s) may not be immediately detected. This is, in part, because after passing the isolated event the vehicle's suspension system may mask any residual damage related to the contact.

In some instances, for example, when a vehicle runs on a rough road and/or smooth road surface with a deteriorated suspension, large-scale suspension vibrations can occur in the vehicle's suspension system that are induced by the rough road or caused by the degraded suspension. Thus, it is useful to have a vehicle on-board system that can dynamically detect large-scale suspension vibrations and record related data.

For example, in accordance with the present teachings, a vehicle on-board system can collect real-time information regarding vertical vibration signals, representative of large-scale suspension vibrations, and evaluate those signals to determine whether a rough road condition and/or suspension degradation exists. At the same time, based on the collected information, the vehicle on-board system can filter out transient, isolated large-scale suspension vibrations related to an abnormal road condition. When, for example, a rough road condition or suspension degradation is detected, the vehicle on-board system sends a warning message to the vehicle driver to pay increased attention to the rough road condition or reminds the vehicle driver to check the suspension system for damage and/or an undesired operational condition caused by the large-scale suspension vibrations on a relatively smooth road surface.

By detecting and/or recording data about large-scale suspension vibrations at the vehicle on-board system, the vehicle on-board system can proactively alert, in advance or in real-time, a vehicle driver of a rough road condition and/or degraded suspension and prevent unnecessary damage to the vehicle. Further, for intelligent vehicles employing an auto-drive mode, the vehicle on-board system may be used to quickly and accurately warn a vehicle driver of the detected rough road condition and/or degraded suspension such that the vehicle driver can switch the vehicle's operating mode from an auto-drive mode to a driver-control mode. In this manner, the vehicle's ride comfort and handling can be simultaneously improved, thus also improving driving safety.

Turning now to the drawings, FIG. 1 shows a schematic structural diagram of an exemplary vehicle 100 on which an exemplary control system (not shown) is mounted. The control system includes a drive force transmission (not shown), which generates a drive force and transmits it to right front wheel 102 FR, left front wheel 102 FL, right rear wheel 102 RR, and rear left wheel 102 RL; a brake control module (not shown) for generating braking force in each wheel 102 FR, 102 FL, 102 RR, and 102 RL by brake hydraulic pressure; exemplary sensors 112, 114; and an electronic control module 104.

In an exemplary embodiment, the drive force transmission includes an engine that generates a drive force; a transmission whose input shaft is connected to an output shaft of the engine; and, differentials 108, 110 that distribute and transmit the drive force from the engine to the front wheels 102 FR, 102 FL and rear wheels 102 RR, 102 RL. The brake control module (not shown) includes a brake hydraulic pressure generating portion that generates hydraulic pressure, which corresponds to an operating force of a brake pedal at the front wheels 102 FR, 102 FL and rear wheels 102 RR, 102 RL of the vehicle 100. Brake hydraulic adjusting sections also can be provided at each of the front wheels 102 FR, 102 FL and rear wheels 102 RR, 102 RL, each of which can adjust the brake hydraulic pressure supplied to corresponding wheel cylinders WFR, WFL, WRR, and WRL. The exemplary sensors can include existing vehicle sensors used in conventional vehicles as well as additional sensors when required. For example, as shown in FIG. 1, wheel position sensors 112 FR, 112 FL, 112 RR, and 112 RL are provided. These sensors 112 FR, 112 FL, 112 RR, and 112 RL each output signals having frequencies corresponding to respective wheel-to-body movement and suspension height information. The exemplary sensors also may include, for example, accelerometer sensors 114 FR, 114 FL, 114 RR, and 114 RL. Accelerometer sensors 114 FR, 114 FL, 114 RR, and 114 RL may be mounted on each corner of the vehicle 100 and/or embedded in a spindle or other suspension component of the vehicle's suspension system, and each sensor outputs signals corresponding to a respective vertical acceleration of a portion of the body of the vehicle 100.

The electronic control module 104 is a microcomputer which includes a Central Processing Unit (CPU); Read-Only Memory (ROM) in which are previously stored routines (programs) to be executed by the CPU, tables (look-up tables), constants, and the like; Random-Access Memory (RAM) in which the CPU temporarily stores data as necessary; Back-up RAM which stores data when the power supply is on and which maintains the stored data when the power supply is cut off; and an interface (not shown). In an exemplary embodiment, the interface (not shown) is integrated with the vehicle on-board system 106 and can be configured to supply signals from the wheel position sensors 112 FR, 112 FL, 112 RR, and 112 RL and accelerometer sensors 114 FR, 114 FL, 114 RR, and 114 RL to the vehicle on-board system 106, via, for example, the CPU of the electronic control module 104. Further, in accordance with instructions from the vehicle on-board system 106, the interface via the CPU outputs a warning message to, for example, a vehicle driver to alert the driver of a possible rough road condition and/or suspension degradation. More specifically, the warning message can instruct the vehicle driver to pay more attention to a detected rough road condition or remind the vehicle driver to check the vehicle's suspension system to see if it has impending damage (e.g., the hydraulic shock absorbers have an impaired ability to damp) or an undesired operational condition (e.g., an unbalanced wheel) caused by large-scale suspension vibrations, e.g., an international roughness index (IRI) that is between 3.5 and 4.6 m/km, occurring on a relatively smooth road surface condition.

In another exemplary embodiment, for intelligent vehicles, in accordance with instructions from the vehicle on-board system 106, the interface via the CPU outputs a warning message to, for example, a vehicle driver to instruct the vehicle driver to switch a current operating mode from, for example, auto-drive mode to driver-control mode such that the vehicle driver controls operation of the vehicle. In this manner, an accident or unnecessary damage due to a detected rough road condition and/or possible suspension degradation can be mitigated. Thus, an effective vehicle on-board system 106 for detecting a rough road condition and large-scale suspension vibrations is a useful feature which can enhance vehicle safety, particularly for vehicles with an auto-drive (or self-driving) mode.

Figure 2:
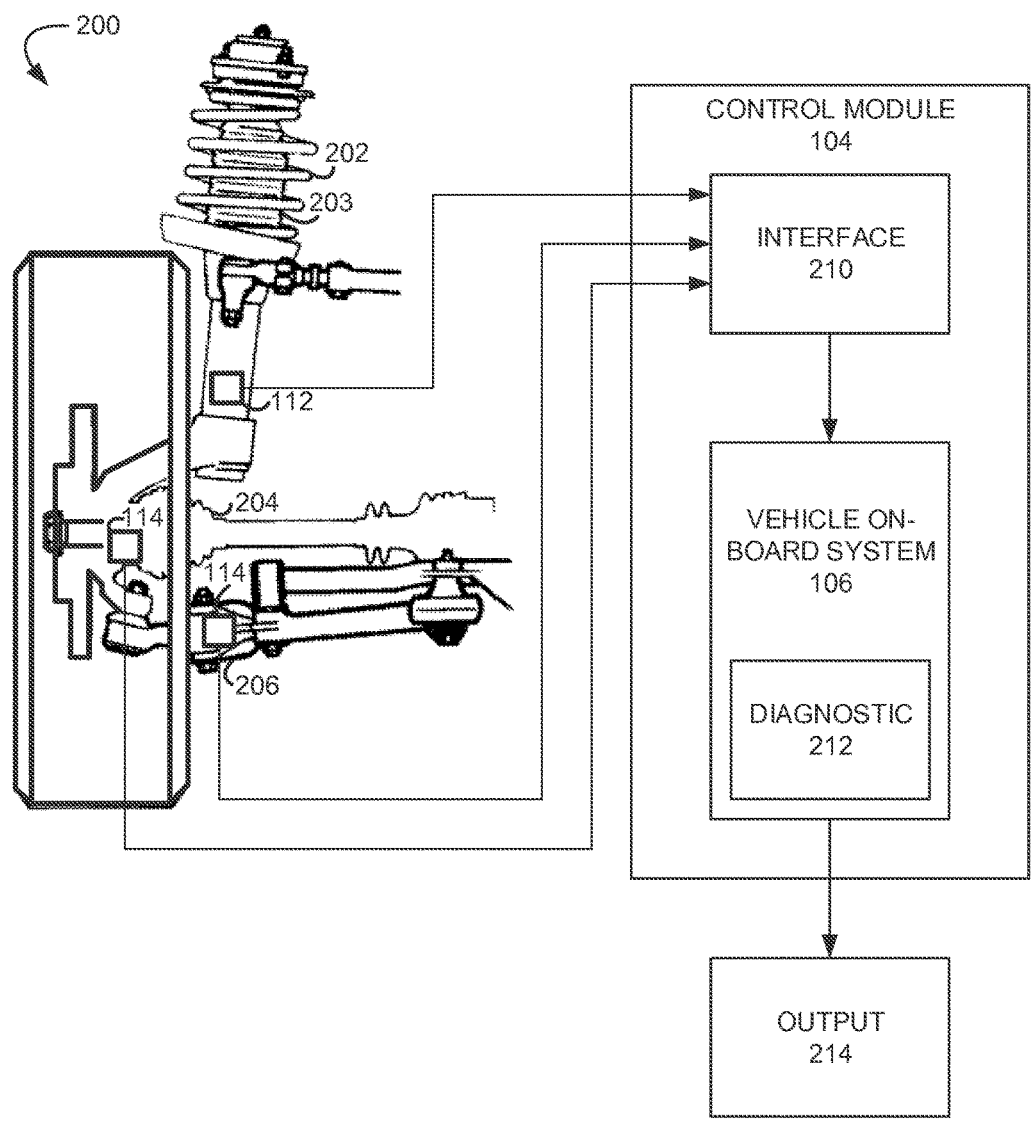
FIG. 2 is an illustration of a wheel suspension system, according to one or more exemplary embodiments of the disclosed subject matter.

FIG. 2 is a schematic illustration of a deteriorated wheel suspension 200 corresponding to wheels 102 FR, 102 FL, 102 RR, and 102 RL of a vehicle suspension system of a vehicle 100. In FIG. 2, the wheel suspension 200 of the vehicle's suspension system includes spring element 202 and hydraulic shock absorbers 203. The spring element 202 and hydraulic shock absorbers 203 together are designed to smooth out or damp shock impulse, and dissipate kinetic energy. This reduces the effect of traveling over rough ground, leading to improved ride quality, and increase in comfort due to substantially reduced amplitude of disturbances.

For example, when vehicle 100 travels on a level road and the wheels 102 FR, 102 FL, 102 RR, and 102 RL of vehicle 100 strike an exceptional (abnormal) road condition, such as debris, potholes, bumps, etc., the spring element 202 is compressed quickly. The compressed spring element 202 attempts to return to its normal loaded length and, in doing so, may rebound past its normal height, causing the body of the vehicle 100 to be lifted (e.g., suspension vibrations). If unchecked, the energy stored in spring element 202 results in a bouncing ride. Due to the improved design of hydraulic shock absorbers 203, mounts, bushings, etc., that help to "block" and/or damp shock impulses from being transferred to vehicle occupants, early warning signs of suspension degradation and/or an encountered rough road condition may be difficult to detect. Further, while isolated large-scale suspension vibrations, resultant from an encountered abnormal road condition, may be felt by vehicle occupants, often there is no clear indication to a vehicle driver of related residual effects unless the vehicle is severely damaged.

Over time, suspension degradation (e.g., an impaired ability of the hydraulic shock absorbers 203 to damp oscillations) may result in large-scale, e.g., an International Roughness Index (IRI) between 3.5 m/km and 4.6 m/km, suspension vibrations that are continuously induced and, in some instances, not felt by vehicle occupants. In an exemplary embodiment, the vehicle 100 includes a vehicle on-board system 106 with a diagnostic unit 212 configured to detect large-scale suspension vibrations promptly and to identify and filter out those suspension vibrations that result from contact with an abnormal road condition.

As illustrated in FIG. 2, the deteriorated wheel suspension 200 includes wheel position sensors 112 FR, 112 FL, 112 RR, and 112 RL which respectively output signals having frequencies corresponding to wheel-to-body movement and suspension height information. Accelerometer sensors 114 FR, 114 FL, 114 RR, and 114 RL may be mounted on each corner of the vehicle 100 and may output signals corresponding to a vertical acceleration of a respective portion of the body of the vehicle 100. In an exemplary embodiment, for example, accelerometer sensors 114 FR, 114 FL, 114 RR, and 114 RL are embedded in the spindle 204 or other suspension component such as lower control arm 206 (e.g., in the unsprung mass of the wheel suspension 200), which experiences relatively large vertical travel. The wheel position and accelerometer sensors 112, 114 are used by the vehicle's control module 104 to effectively capture large-scale suspension vibrations that occur due to a rough road condition and/or a deteriorated suspension system.

For example, in an exemplary embodiment, wheel position sensors 112 FR, 112 FL, 112 RR, and 112 RL and accelerometer sensors 114 FR, 114 FL, 114 RR, and 114 RL are configured to dynamically capture vertical suspension height data and vertical acceleration data that corresponds to a present position of the body of the vehicle 100. Interface 210, illustrated in FIG. 2, is integrated with the vehicle on-board system 106 and is configured to supply signals received from the wheel position sensors 112 FR, 112 FL, 112 RR, and 112 RL and accelerometer sensors 114 FR, 114 FL, 114 RR, and 114 RL to the vehicle on-board system 106, via, for example, the CPU of the electronic control module 104. The vehicle on-board system 106 uses, for example, diagnostic unit 212 to calculate a peak value (PV) and a Root Mean Square Value (RMS) based on the captured vertical acceleration based on a predetermined, configurable moving window of time (e.g., the width of the widow is flexible and can be, for example, 1 second (s), 3 s, 5 s, etc., and can be preset to a predetermined width (e.g., length of time)). The calculated PV and RMS values are compared to calibrated targets for the peak value (TPV) and RMS (TRMS). If, in a first window, the calculated PV from the moving window is greater than the TPV, then the peak damage value (PDV) is equal to one. If then, in a second window, subsequent to the first window and preset for the same width, or length of time, the calculated PV is less than the TPV, the PDV is reset to zero. If, in a third window, subsequent to the first and second periods of time, the calculated PV from the moving window is again greater than the TPV, the PDV is equal to two. The diagnostic unit 212 continues to check calculated PV by the moving window with the preset width. In an exemplary embodiment, once the PDV accumulates to, for example, a value of three or more, in accordance with instructions from the vehicle on-board system 106, the control module 104 via the CPU and/or interface 210 outputs 214 a warning message to, for example, a vehicle driver alerting the driver of a large-scale suspension vibrations. The warning message can be either road induced and/or induced by detected suspension degradation. In an exemplary embodiment, an algorithm can be implemented to check whether the large-scale suspension vibration warning message is received from a front and/or rear of the vehicle. If the warning message is not received from either the front and/or rear of the vehicle, the warning message may be due to possible suspension degradation.

In another exemplary embodiment, for example, the vehicle on-board system 106 uses via diagnostic unit 212 uses the same configured moving window to check the RMS value. The RMS value is compared to calibrated targets for the peak RMS (TRMS). If, in a first window, the calculated RMS value from the moving window is greater than the TRMS, then the RMS damage value (RMSDV) is equal to one. Then, in a second window, subsequent to the first window and preset for the same width, or length of time, if the calculated RMS value is less than the TRMS, the RMSDV is reset to zero. If, in a third window, subsequent to the second window, the calculated RMS value from the moving window is again greater than the TRMS, the RMSDV is equal to two. The diagnostic unit 212 continues to check calculated RMS value by the moving window with the preset width. In an exemplary embodiment, once the RMSDV accumulates to, for example, a value of three or more, in accordance with instructions from the vehicle on-board system 106, the control module 104 via the CPU and/or interface 210 outputs 214 a warning message to, for example, a vehicle driver alerting the driver of a large-scale suspension vibration from possible rough road condition.

In another exemplary embodiment, the TPV and TRMS values can be calibrated from a typical rough road surface used in vehicle durability (e.g., International Road Index (ARI)) or from noise, vibration, and harshness (NVH) tests). The diagnostic unit 212 can be configured to check outputs of warning messages to, for example, a vehicle driver against encountered abnormal road conditions, e.g., severe, but transient events, to make sure that the warning messages are triggered at the vehicle on-board system 106 only for continuous rough road surfaces, and not on transient events such as encountered abnormal road conditions. For example, transient surfaces and/or events such as potholes and/or bumps may be eliminated, e.g., not considered, while continuous rough road surfaces such as gravel roads are considered for triggering the warning messages.

Figure 3:
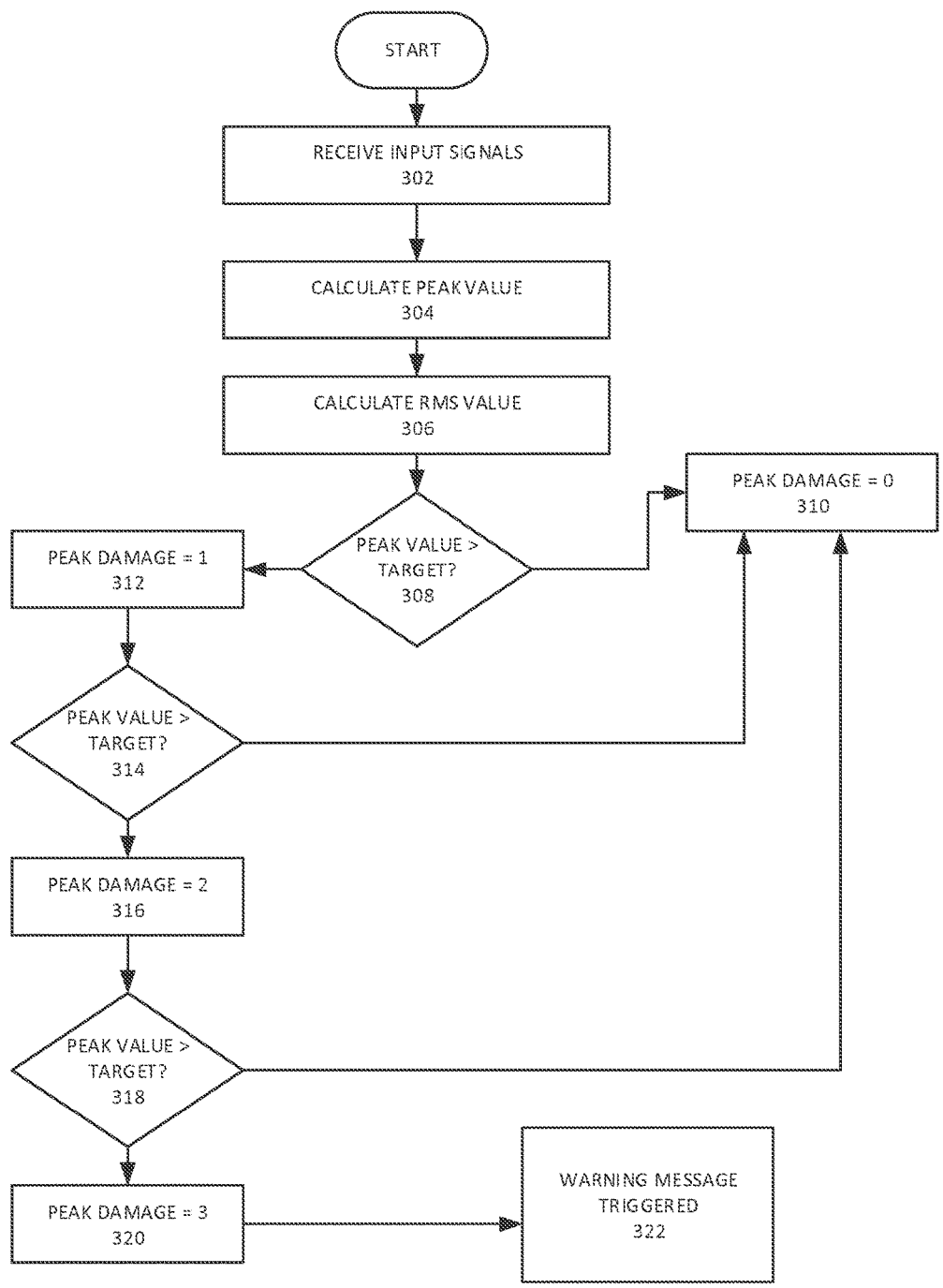
FIG. 3 is a simplified routine executed by a control module of the vehicle illustrated in FIG. 1, according to one or more exemplary embodiments of the disclosed subject matter.

As illustrated in FIG. 3, at Step 302, signals corresponding to information and/or data dynamically captured by wheel position sensors 112 FR, 112 FL, 112 RR, and 112 RL and accelerometer sensors 114 FR, 114 FL, 114 RR, and 114 RL are received at a CPU of electronic control module 104. For example, wheel position sensors 112 FR, 112 FL, 112 RR, and 112 RL are configured to detect a vertical suspension height of the vehicle 101 and output signals that correspond to the suspension height of the vehicle. Accelerometer sensors 114 FR, 114 FL, 114 RR, and 114 RL are configured to detect and output signals that correspond to the vertical acceleration of the body of the vehicle 100.

In an exemplary embodiment, accelerometer sensors 114 FR, 114 FL, 114 RR, and 114 RL are embedded on, for example, an upper mounting metal portion of a shock absorber and/or strut to capture the vertical vibration of the suspension. Alternatively, the embedded sensors 114 FR, 114 FL, 114 RR, and 114 RL are strain gages (e.g., used to capture the in-plane deformation of the upper mounting metal portion due to a vertical load transferred from the shock absorber or strut).

At Steps 304 and 306, the captured vibration data, e.g., from accelerometer sensors 114 FR, 114 FL, 114 RR, and 114 RL, is processed by the electronic control module 104 to calculate a peak value (PV) and an RMS value. For example, at Steps 304 and 306, interface 210 is integrated with the vehicle on-board system 106 and is configured to supply signals received from accelerometer sensors 114 FR, 114 FL, 114 RR, and 114 RL at Step 302. The vehicle on-board system 106 uses, for example, diagnostic unit 212 to calculate a peak value (PV) and a Root Mean Square (RMS) value based on the captured vertical acceleration by a configurable moving window. The moving window may be calibrated and preset for a specific width (i.e., a specific period of time, for example, 1 s, 3 s, 5 s, etc.). For example, a guideline for the moving window timing may be set such that the moving window is (i) not so small as to detect transient events, and (ii) not so large that it fails to detect rough road surfaces in a sufficient period of time so that the vehicle has the opportunity to react to the detected rough road. The moving window timing, e.g., window setting, is configured as a tunable parameter.

At Step 308, the calculated PV and RMS values are compared to calibrated targets for the peak value (TPV) and RMS (TRMS). If, at Step 312, during a first moving window, the calculated PV from the moving window is greater than the TPV, then the peak damage value (PDV) is equal to one. If, at Step 310, during the first moving window, the calculated PV is less than the TPV, the PDV is reset to zero. If, at Step 314, during the first moving window, the calculated PV from the moving window is again greater than the TPV, the PDV is equal to two at Step 316. If, at Step 316, during the first moving window, the calculated PV is less than the TPV, the PDV is reset to zero at Step 310. If, at Step 318, during the first moving window, the calculated PV is again greater than the TPV, the PDV is equal to three at Step 320. If, at Step 318, during the first moving window, the calculated PV is less than the TPV, the PDV is reset to zero at Step 310. The diagnostic unit 212 continues to check the calculated PV by the moving window with respect to the preset width. In an exemplary embodiment, once the PDV accumulates to a preset value, for example, of two or more, in accordance with instructions from the vehicle on-board system 106, the control module 104 via the CPU and/or interface 210 outputs a warning message at Step 322 to, for example, a vehicle driver alerting the driver of a large-scale suspension vibrations. In an alternative embodiment, for example, a usage mechanism may be applied to the warning message output at Step 322. For example, the output warning message may be configured such that it includes a warning for further investigation and/or mitigation of detected suspension vibrations via the active suspension system and/or a semi-active suspension system.

The diagnostic unit 212 continues to check calculated PV by the moving window with the preset width. In an exemplary embodiment, once the PDV accumulates to, for example, a value of three or more, in accordance with instructions from the vehicle on-board system 106, the control module 104 via the CPU and/or interface 210 outputs 214 a warning message to, for example, a vehicle driver alerting the driver of a severe large-scale suspension vibrations.

In another exemplary embodiment, at Step 308, the calculated PV and RMS values are compared to calibrated targets for the peak value (TPV) and RMS (TRMS). If, at Step 312, during a first moving window, the calculated RMS value from the moving window is greater than the TRMS, then the RMS damage value (RMSDV) is equal to one. If, at Step 310, during the first moving window, the calculated RMS value is less than the TRMS, the RMSDV is reset to zero. If, at Step 314, during the first moving window, the calculated RMS value from the moving window is again greater than the TRMS, the RMSDV is equal to two at Step 316. If, at Step 316, during the first moving window, the calculated RMS value is less than the TRMS, the RMSDV is reset to zero at Step 310. If, at Step 318, during the first moving window, the calculated RMS value is again greater than the TRMS, the RMSDV is equal to three at Step 320. If, at Step 318, during the first moving window, the calculated RMS value is less than the TRMS, the RMSDV is reset to zero at Step 310.

The diagnostic unit 212 continues to check the calculated RMS value by the moving window with respect to the preset width. In an exemplary embodiment, once the RMSDV accumulates to a preset value, for example, of two or more, in accordance with instructions from the vehicle on-board system 106, the control module 104 via the CPU and/or interface 210 outputs a warning message at Step 322 to, for example, a vehicle driver alerting the driver of a severe large-scale suspension vibrations from possible rough road condition.

In another exemplary embodiment, for example, at Step 302, signals corresponding to information and/or data dynamically captured by embedded accelerometer sensors 114 FR, 114 FL, 114 RR, and 114 RL and strain gauge sensors (not shown) are received at a CPU of electronic control module 104. For example, accelerometer sensors 114 FR, 114 FL, 114 RR, and 114 RL and strain gauge sensors are configured to detect and output signals that correspond to the vertical acceleration of the body of the vehicle 100 and to in-plane deformation due to a vertical load.

For example, in an exemplary embodiment, accelerometer sensors 114 FR, 114 FL, 114 RR, and 114 RL are embedded in the spindle 204 or other suspension component such as lower control arm 206 (e.g., in the unsprung mass of the wheel suspension 200), which experiences relatively large vertical travel. In addition, strain gauge sensors are embedded on an upper mounting metal portion of the shock absorber 203 and/or strut (e.g., used to capture the in-plane deformation of the upper mounting metal portion due to a vertical load transferred from the shock absorber or strut) to capture the vertical vibration of the suspension.

At Steps 304 and 306, the captured vibration data, e.g., from accelerometer sensors 114 FR, 114 FL, 114 RR, and 114 RL and strain gauge sensors (not shown), is processed by the electronic control module 104 to calculate a peak value (PV) and an RMS value. For example, at Steps 304 and 306, interface 210 is integrated with the vehicle on-board system 106 and is configured to supply signals received from accelerometer sensors 114 FR, 114 FL, 114 RR, and 114 RL and strain gauge sensors (not shown) at Step 302. The vehicle on-board system 106 uses, for example, diagnostic unit 212 to calculate a peak value (PV) and a Root Mean Square (RMS) value based on the captured vertical acceleration and in-plane deformation by a configurable moving window. The moving window may be calibrated and preset for a specific period of time, for example, 1 s, 3 s, 5 s, etc.

At Step 308, the calculated PV value is compared to calibrated targets for the peak lower value (TPLV) and peak upper value (TPUV). If, at Step 312, during a first moving window, the calculated PV from the moving window is greater than the TPUV and/or less than the TPLV, then the peak damage value (PDV) is equal to one. If, at Step 310, during the first moving window, the calculated PV is between the TPLV and the TPUV, then PDV is reset to zero. If, at Step 314, during the first moving window, the calculated PV from the moving window is again greater than the TPUV and/or less than the TPLV, the PDV is equal to two at Step 316. If, at Step 316, during the first moving window, the calculated PV is between the TPLV and the TPUV, the PDV is reset to zero at Step 310. If, at Step 318, during the first moving window, the calculated PV is again greater than the TPUV and/or less than the TPLV, the PDV is equal to three at Step 320. If, at Step 318, during the first moving window, the calculated PV is between the TPLV and the TPUV, the PDV is reset to zero at Step 310.

The diagnostic unit 212 continues to check the calculated PV by the moving window with respect to the preset width. In an exemplary embodiment, once the PDV accumulates to a preset value, for example, of two or more, in accordance with instructions from the vehicle on-board system 106, the control module 104 via the CPU and/or interface 210 outputs a warning message at Step 322 to, for example, a vehicle driver alerting the driver of a large-scale suspension vibrations.

In another exemplary embodiment, at Steps 304 and 306, the captured vibration data, e.g., from accelerometer sensors 114 FR, 114 FL, 114 RR, and 114 RL and strain gauge sensors (not shown), is processed by the electronic control module 104 to calculate a peak value (PV) and a Root Mean Square (RMS) value. For example, at Steps 304 and 306, interface 210 is integrated with the vehicle on-board system 106 and is configured to supply signals received from accelerometer sensors 114 FR, 114 FL, 114 RR, and 114 RL and strain gauge sensors (not shown) at Step 302. The vehicle on-board system 106 uses, for example, diagnostic unit 212 to calculate a peak value (PV) and a Root Mean Square (RMS) value based on the captured vertical acceleration and in-plane deformation by a configurable moving window. The moving window may be calibrated and preset for a specific period of time, for example, 1 s, 3 s, 5 s, etc.

At Step 308, the calculated RMS values are compared to calibrated targets for the lower RMS value (TLRMS) and upper RMS value (TURMS). If, at Step 312, during a first moving window, the calculated RMS value from the moving window is greater than the TURMS value and/or less than the TLRMS, then the RMS damage value (RMSDV) is equal to one. If, at Step 310, during the first moving window, the calculated RMS value is between the TLRMS and the TURMS, then RMSDV is reset to zero. If, at Step 314, during the first moving window, the calculated RMS value from the moving window is again greater than the TURMS and/or less than the TLRMS, the RMSDV is equal to two at Step 316. If, at Step 316, during the first moving window, the calculated RMS value is between the TLRMS and the TURMS, the RMSDV is reset to zero at Step 310. If, at Step 318, during the first moving window, the calculated RMS value is again greater than the TURMS and/or less than the TLRMS, the RMSDV is equal to three at Step 320. If, at Step 318, during the first moving window, the calculated RMS value is between the TLRMS and the TURMS, the RMSDV is reset to zero at Step 310.

The diagnostic unit 212 continues to check the calculated RMS value by the moving window with respect to the preset width. In an exemplary embodiment, once the RMSDV accumulates to a preset value, for example, of two or more, in accordance with instructions from the vehicle on-board system 106, the control module 104 via the CPU and/or interface 210 outputs a warning message at Step 322 to, for example, a vehicle driver alerting the driver of large-scale suspension vibrations due to a rough road condition.

By detecting and/or recording data about large-scale suspension vibrations at the vehicle on-board system 106, the vehicle on-board system 106 can proactively alert a vehicle driver of a rough road condition and/or degraded suspension and prevent accident or unnecessary damage to the vehicle. Further, for intelligent vehicles 100 employing an auto-drive mode, the vehicle on-board system 106 may be used to quickly and accurately warn a vehicle driver of the detected rough road condition and/or degraded suspension such that the vehicle driver can switch the vehicle's 100 operating mode from an auto-drive mode to a driver-control mode. In this manner, the vehicle's ride comfort, handling, and safety can be simultaneously improved.

The method described above can be performed in one or more devices of the vehicle. For example, the method can be performed by a control device of the suspension system such as a central control unit (not shown) or controller. The control device can be implemented within any element of the suspension system such as a control unit. Alternatively, the control device can be a separate device from any of the above-described suspension system elements.

The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A system for monitoring a vehicle suspension system, comprising:
   accelerometer sensors; and
   a controller configured to receive signals from the accelerometer sensors;
   wherein the controller is configured to:

calculate an RMS value based on the signals and a predetermined period of time,
compare the calculated RMS value to a target RMS value to determine whether the calculated RMS value is outside a range defining the target RMS value, and
alert a driver of the vehicle of a rough road condition when the calculated RMS value is outside the range.

2. The system of claim 1, wherein the accelerometer sensors are embedded within a shock absorber of the suspension system.

3. A method for monitoring a vehicle suspension system, comprising:
receiving signals corresponding to vertical acceleration of one or more portions of a vehicle body from one or more sensors associated with the suspension system;
calculating a RMS value based on the vertical acceleration for each of a plurality of predetermined time periods;
comparing each calculated RMS value to a target RMS; and
incrementing a RMS damage value each time the calculated RMS exceeds the target RMS; and
when the RMS damage value meets a preset criteria, outputting a message regarding large-scale suspension vibrations.

4. The method of claim 3, wherein outputting the message regarding the large-scale suspension vibrations comprises outputting a warning message to a vehicle driver regarding a rough road condition.

5. The method of claim 4, wherein outputting the warning message regarding the rough road condition further comprises instructing the vehicle driver to change an operating mode of the vehicle.

6. The method of claim 5, wherein instructing the vehicle driver to change the operating mode comprises instructing the vehicle driver to switch the operating mode from an auto-drive mode to a driver-control mode.

7. The method of claim 3, wherein each of the plurality of predetermined time periods is the same.

8. The method of claim 3, further comprising calibrating the target RMS based on an International Roughness Index (IRI).

9. The method of claim 3, further comprising receiving signals relating to vertical suspension height from one or more sensors associated with the suspension system.

10. The method of claim 3, wherein outputting the message regarding the large-scale suspension vibrations comprises outputting a warning message regarding a possible degradation of the suspension system.

11. A system for monitoring a vehicle suspension system, comprising:
a processing unit configured to:
receive a signal corresponding to a vertical acceleration of a vehicle body relative to a road surface from a sensor associated with the suspension system;
calculate an RMS value based on the vertical acceleration and a predetermined period of time;
compare the calculated RMS value to a target RMS value to determine whether the calculated RMS value meets a preset criteria indicative of a rough road condition; and
when the calculated RMS value meets the preset criteria, alert a vehicle driver of the rough road condition.

12. A method for monitoring a vehicle suspension system, comprising:
receiving a signal corresponding to a vertical acceleration of a vehicle body relative to a road surface from a sensor associated with the suspension system;
calculating an RMS value based on the vertical acceleration and a predetermined period of time;
comparing the calculated RMS value to a target RMS value to determine whether the calculated RMS value meets a preset criteria indicative of a rough road condition; and
when the calculated RMS value meets the preset criteria, alerting a vehicle driver of the rough road condition.

13. The method of claim 12, further comprising:
calibrating the target RMS value based on an International Roughness Index (IRI).

14. The method of claim 12, further comprising:
capturing in-plane deformation of a mounting portion of a shock absorber based on signals received from a strain gauge sensor embedded on a shock absorber of the suspension system.

15. The method of claim 12, wherein the calculated RMS value does not meet the preset criteria when the calculated RMS value is within a range defining the target RMS value.

16. The method of claim 12, wherein the calculated RMS value meets the preset criteria when the calculated RMS value is outside a range defining the target RMS value.

17. The method of claim 12, further comprising determining that the RMS value meets the preset criteria when the preset criteria exceeds an RMS damage value threshold.

18. The system of claim 11, wherein the sensor comprises one or more accelerometer sensors embedded on a shock absorber of the suspension system.

19. The system of claim 11, wherein the preset criteria is a RMS damage value that exceeds a threshold value.

20. The system of claim 11, wherein the target RMS value is calibrated based on noise, vibration, and harshness (NVH) tests.

* * * * *